(12) United States Patent
Higham et al.

(10) Patent No.: US 9,411,542 B2
(45) Date of Patent: Aug. 9, 2016

(54) INTERRUPTIBLE STORE EXCLUSIVE

(71) Applicant: ANALOG DEVICES TECHNOLOGY, Hamilton (BM)

(72) Inventors: Andrew J. Higham, Edinburgh (GB); Gregory M. Yukna, Norton, MA (US)

(73) Assignee: Analog Devices Global, Hamilton (BM)

( * ) Notice: Subject to any disclaimer, the term of this patent is extended or adjusted under 35 U.S.C. 154(b) by 347 days.

(21) Appl. No.: 14/187,058

(22) Filed: Feb. 21, 2014

(65) Prior Publication Data

US 2015/0242334 A1 Aug. 27, 2015

(51) Int. Cl.
*G06F 3/06* (2006.01)

(52) U.S. Cl.
CPC ............. *G06F 3/0673* (2013.01); *G06F 3/061* (2013.01); *G06F 3/0637* (2013.01)

(58) Field of Classification Search
CPC ..... G06F 3/0673; G06F 3/061; G06F 3/0637; G06F 3/06
See application file for complete search history.

(56) References Cited

U.S. PATENT DOCUMENTS

| | | | | |
|---|---|---|---|---|
| 6,892,257 B2 * | 5/2005 | Grisenthwaite | ........... | G06F 9/52 710/200 |
| 8,285,937 B2 * | 10/2012 | Bannon | ................. | G06F 9/3004 711/122 |
| 8,516,211 B2 * | 8/2013 | Wyles | ................... | G06F 9/5016 711/152 |
| 8,782,356 B2 * | 7/2014 | Panavich | ............ | G06F 13/1621 711/154 |
| 8,839,038 B2 * | 9/2014 | Williams | ............ | G06F 11/2236 714/34 |
| 2002/0073259 A1 * | 6/2002 | Grisenthwaite | ........... | G06F 9/52 710/107 |
| 2006/0004964 A1 * | 1/2006 | Conti | ................. | G06F 12/0891 711/136 |
| 2006/0005072 A1 * | 1/2006 | Philippe Conti | ........ | G06F 21/82 714/5.11 |
| 2007/0052704 A1 * | 3/2007 | Pedley | ................... | G06T 15/405 714/5.11 |
| 2010/0077143 A1 | 3/2010 | Reid et al. | | |
| 2011/0161599 A1 * | 6/2011 | Craske | ................ | G06F 12/0831 711/141 |
| 2011/0208915 A1 * | 8/2011 | Bannon | ................. | G06F 9/3004 711/122 |
| 2012/0239913 A1 * | 9/2012 | Williams | ............ | G06F 11/2236 712/227 |
| 2013/0097389 A1 * | 4/2013 | Suzuki | .................... | G06F 9/526 711/147 |
| 2013/0151799 A1 * | 6/2013 | Panavich | ............ | G06F 13/1621 711/157 |
| 2014/0040221 A1 * | 2/2014 | Wyles | ................... | G06F 9/5016 707/704 |
| 2014/0052921 A1 * | 2/2014 | Biles | ..................... | G06F 9/3834 711/125 |

(Continued)

OTHER PUBLICATIONS

Jonathan R. Engdahl et al., "Lock-Free Data Structure for Multi-Core Processors", Oct. 27-30, 2010, International Conference on Control, Automation and Systems, pp. 984-989, http://ieeexplore.ieee.org/stamp/stamp.jsp?tp=&arnumber=5669659.*

(Continued)

*Primary Examiner* — Christopher D Birkhimer
(74) *Attorney, Agent, or Firm* — Patent Capital Group

(57) ABSTRACT

In one example, there is disclosed herein a processor configured for interruptible atomic exclusive memory operations. For example, a load exclusive (LDEX) may be followed by a store exclusive (STREX), with the two together forming an atom. To facilitate timely handling of interrupts, the STREX operation is split into two parts. The STREX_INIT is not interruptible but has a determinate execution time because it takes a fixed number of clock cycles. The STREX_INIT sends the value out to the memory bus. It is followed by a STREX_SYNC operation that polls a flag for whether a return value is available. STREX_SYNC is interruptible, and methods are disclosed for determining whether, upon return from an interrupt, atomicity of the operation has been broken. If atomicity is broken, the instruction fails, while if atomicity is preserved, the instruction completes.

21 Claims, 7 Drawing Sheets

(56) References Cited

U.S. PATENT DOCUMENTS

2014/0310480 A1* 10/2014 Piry ................... G06F 12/0815
                                                        711/146
2014/0344621 A1* 11/2014 Williams ............ G06F 11/2236
                                                        714/34

OTHER PUBLICATIONS

OA1 issued in Korean Patent Application Serial No. 10-2014102135.8 mailed Nov. 18, 2015, 3 pages.
English Summary of OA1 issued in Korean Patent Application Serial No. 10-2014102135.8 mailed Nov. 18, 2015, 2 pages.
Response to OA1 issued in Korean Patent Application Serial No. 10-2014102135.8 filed Jan. 15, 2016, 23 pages.
Notice of Allowance issued in KR Patent Application Serial No. 10-2015-0022234 mailed May 4, 2016, 2 pages.
English Translations of Allowed Claims re Notice of Allowance issued in KR Patent Application Serial No. 10-2015-0022234 mailed May 4, 2016, 4 pages.

* cited by examiner

INTERRUPTIBLE STORE EXCLUSIVE

FIELD OF THE DISCLOSURE

This application relates to the field of computer architecture, and more particularly to a digital signal processor or other processor with an interruptible store exclusive primitive.

BACKGROUND

Advanced Microcontroller Bus Architecture (AMBA) is an open, published standard for an on-chip bus useful in designing systems-on-a-chip (SoC) and application-specific integrated circuit (ASIC)-based microcontrollers. It is used in a wide range of mobile, embedded, and low-power environments. Since its inception, the scope of AMBA has gone far beyond microcontroller devices, and is now widely used on a range of ASIC and SoC parts, including applications processors used in modern portable mobile devices like smartphones. The AMBA standard specifies connection and management of functional blocks in appropriate systems, and is useful in designing systems with multiple controllers and/or peripherals.

The third generation of AMBA includes the advanced extensible interface (AXI), which is designed to accommodate high-performance, high-clock-frequency systems.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
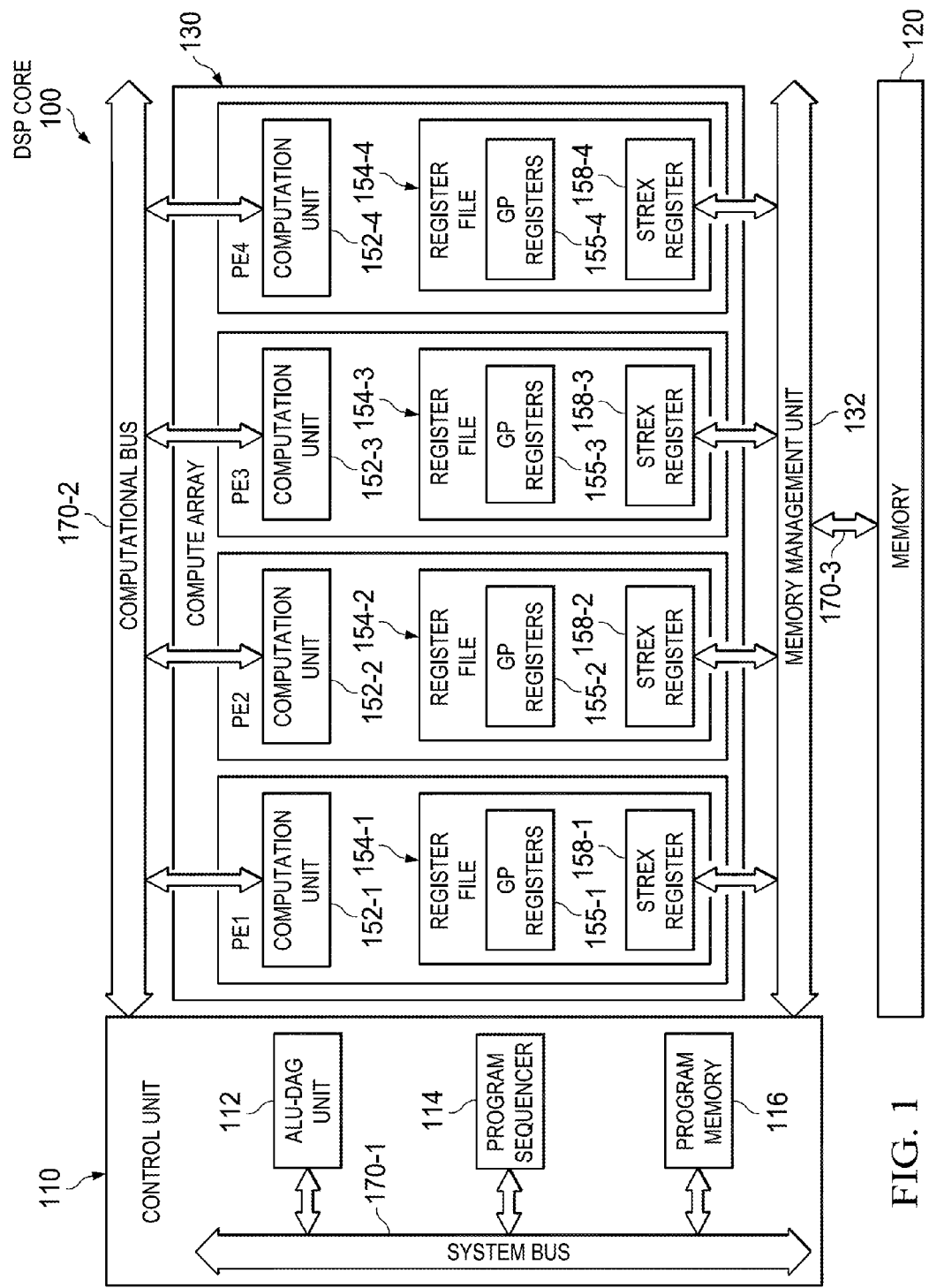
FIG. 1 is a schematic block diagram of an example digital signal processor (DSP) core according to one or more examples of the present Specification.

In one example, there is disclosed herein a processor configured for interruptible atomic exclusive memory operations. For example, a load exclusive (LDEX) may be followed by a store exclusive (STREX), with the two together forming an atom. To facilitate timely handling of interrupts, the STREX operation is split into two parts. The STREX_INIT is not interruptible but has a determinate execution time because it takes a fixed number of clock cycles. The STREX_INIT sends the value out to the memory bus. It is followed by a STREX_SYNC operation that polls a flag for whether a return value is available. STREX_SYNC is interruptible, and methods are disclosed for determining whether, upon return from an interrupt, atomicity of the operation has been broken. If atomicity is broken, the instruction fails, while if atomicity is preserved, the instruction completes.

In another example, there is disclosed herein a system on a chip comprising a memory; a memory bus communicatively coupled to the memory; and a processor communicatively coupled to the memory via the memory bus, the processor including circuitry for providing store exclusive functionality comprising a store exclusive initialize (STREX_INIT) instruction, the STREX_INIT instruction operable to initiate an exclusive store transaction to a location in the memory; a store exclusive synchronize (STREX_SYNC) instruction, the STREX_SYNC instruction operable to monitor an XWAVAIL indicator, the XWAVAIL indicator operable to indicate that an XWRESULT response to the STREX_INIT primitive is available, the XWRESULT response operable to indicate whether the exclusive store transaction to the location in memory was successful.

In yet another example, there is disclosed herein a digital signal processor system comprising a memory; a memory bus communicatively coupled to the memory; and a compute unit communicatively coupled to the memory via the memory bus, the compute unit operable to provide a store exclusive primitive comprising executing a store exclusive initialize (STREX_INIT) primitive, the STREX_INIT primitive operable to initiate an exclusive store transaction to a location in the memory; executing a separate store exclusive synchronize (STREX_SYNC) primitive, the STREX_SYNC primitive operable to monitor an XWAVAIL indicator, the XWAVAIL indicator operable to indicate that an XWRESULT response to the STREX_INIT primitive is available, the XWRESULT response operable to indicate whether the exclusive store transaction to the location in memory was successful.

In yet another example, there is disclosed herein a method of providing a store exclusive primitive, performed by a computing device, comprising executing a store exclusive initialize (STREX_INIT) primitive, the STREX_INIT primitive operable to initiate an exclusive store transaction to a memory location; executing a separate store exclusive synchronize (STREX_SYNC) primitive, the STREX_SYNC primitive operable to monitor an XWAVAIL indicator, the XWAVAIL indicator, operable to indicate that an XWRESULT response to the STREX_INIT primitive is available, the XWRESULT response operable to indicate whether the exclusive store transaction to the memory location was successful.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

AXI supports a semaphore-type "exclusive" memory access. For example, with a plurality of processing cores operating in parallel, one core may wish to perform an atomic read-operate-write. To ensure that the slave (memory location) is not accessed during the atomic operation, the master (core) may perform an exclusive read and an exclusive write. The bus is not locked during the atomic operation. Rather, a memory controller may flag the affected memory location, and if another master accesses the location after the read is complete and before the write is complete, the AXI bus may set an error flag. An example of a memory controller that supports such an operation is ARM's CoreLink DMC-400 Dynamic Memory Controller. As used throughout this Specification, a "memory controller" includes, in appropriate circumstances, the foregoing memory controller, any equivalent device or structure, a memory management unit (MMU), a combination of a memory controller and MMU, or any device or combination of devices operable to perform the memory management and control methods disclosed herein. In common practice, an MMU may be located on a core-side of the memory architecture, as in FIG. 1, while the bus and memory controller may be on the memory-side. Many other arrangements are possible, and it is intended that this Specification broadly encompass any such arrangement.

According to one or more example embodiments of the present Specification, novel "load exclusive" (LDEX) and "store exclusive" (STREX) primitives are defined. A "primitive" in this context means a basic or primitive operation that may be used to build higher-level operations in conjunction with other primitives or higher-level operations, and may be, by way of non-limiting example, a user-accessible hardware instruction, a non-user-accessible operation performed as part of another hardware instruction, a user-accessible software procedure, or a non-user-accessible software procedure performed as part of a different user-accessible software procedure.

An LDEX primitive reads a value from a memory location and establishes exclusive access to that location. While a core has exclusive access to a location, the memory controller monitors the location and detects if another core tries to establish exclusive access or write a value to the location. In either case, the first core loses exclusive access.

A STREX performs an exclusive write transaction. The memory controller, or equivalent block, ensures that this transaction will only update the memory location if the initiating core has exclusive access to the location. A flag may be set or a return value provided, for example, as a signal on a bus, to indicate whether the location was successfully updated. Thus, using a combination of LDEX and STREX, an atomic memory operation may be performed, such as in setting a lock on a resource or requesting a semaphore. In an example, an atomic operation may comprise reading a lock value from a memory location, checking whether the value is locked, and if the value is unlocked, writing a locked value out to the memory location, and then checking that the location was successfully updated. Evidently, deadlock would occur if a core successfully modified a lock with the locked value but failed to detect that the update had been successful. This may happen, for example, when an interrupt is injected during the exclusive write transaction such that the core is performing other work when the success or failure indication appears on the bus in response to the transaction. Thus, it may appear desirable to lock out interrupts during STREX operations such that deadlock does not occur.

The named inventors of the present Specification have recognized, however, that a non-interruptible STREX primitive may be problematic in cases of a cache or L1 memory miss, in which values must be stored out to slow main memory. This can cause unacceptable delays, particularly in embedded or high-performance systems. This can also be problematic for systems to be certified for real-time operation, as such certification may require determinate latencies that cannot be guaranteed in the case of a STREX primitive that locks out interrupts.

Advantageously, the present Specification defines a STREX primitive that is divided into two separate primitives, each of which is either determinate or interruptible. In an example, the first primitive is called "store exclusive initialize" (STREX_INIT), and initializes a write request without waiting for a response or checking for success. The second primitive is a "store exclusive synchronize" (STREX_SYNC), which is interruptible and which enters a monitoring loop, watching for a flag to be set, indicating that a return value is available for the write request. Once a return value is detected, it is read and conditional branching may occur depending on whether the store exclusive was successful.

The STREX primitive of the present Specification interacts with a state machine that runs in parallel with a main processor pipeline. This state machine is responsible for waiting for the exclusive write transaction response and passing it back to a primitive running in the main processor pipeline.

In an example, the STREX_INIT primitive initiates the write exclusive transaction and causes the STREX state machine to enter a state in which it is waiting for the response to the transaction. This instruction is not intrinsically interruptible, but the operation overall is interruptible within a fixed number of cycles because both operations of the example STREX_INIT take a fixed number of cycles. After STREX_INIT completes, the STREX state machine advances to the STREX_SYNC state.

The STREX_SYNC primitive waits for the STREX state machine to receive the transaction response and enter a "response available state." Once the machine has entered this state, the response is processed and appropriate action is taken. Then the state machine moves into the inactive state.

The STREX_SYNC primitive is interruptible within a fixed number of cycles because it may be aborted while waiting for the STREX state machine to enter the response-available state and then safely restarted on return from interrupt (RTI) without losing the exclusive write transaction response. Once the state machine has entered the response-available state, the response can be copied into the thread context within a fixed number of cycles.

As these two primitives are interruptible within a fixed number of cycles, the sequence consisting of the two primitives is interruptible within a fixed number of cycles.

In one or more embodiments, after any STREX_INIT primitive is executed, a matching STREX_SYNC is expected to complete before another STREX_INIT can be started. This ensures the transaction response is matched to the correct STREX_INIT, which is a requirement of the AXI atomic exclusive protocol. In an example, upon encountering two STREX_INIT primitives without a complete intervening STREX_SYNC, the processor raises an exception.

It may be considered a programmer's responsibility to avoid multiple STREX_INITs within a single program, but on a processor running a multi-tasking operating system, the operating system (OS) may be tasked with ensuring that the STREX sequence is completed and the response copied into the thread context before switching to a new thread or new process. So within its context switch code, the OS may check whether the STREX state machine is either waiting for the response or has the response available and if so, execute a STREX_SYNC to copy the response into the saved thread context. The STREX_SYNC primitive can thus be defined to be a no operation (NOP) when the STREX state machine is inactive, in which case it can be executed unconditionally.

Executing a STREX_SYNC primitive within OS context switch code potentially increases the time it takes to switch context to the duration of any ongoing STREX transaction, but interrupt handlers with higher priority than the context switch code may still execute so that the overall interrupt latency is still fixed.

On a processor that implements the STREX primitives disclosed in this Specification, an interrupt handler with higher priority than the context switch code should not contain STREX_INIT or STREX_SYNC primitives. If they do, they may need to unconditionally execute a STREX_SYNC on entry to the handler to save the response in the context of the interrupted thread. This would wait for completion of an ongoing exclusive write transaction impacting the interrupt latency.

In an example, the STREX_SYNC state may be used in an exception handler to reset exclusive state on exceptions caused by LDEX or STREX primitives.

The LDEX primitive of the present Specification reads data from memory like a regular load instruction and also establishes exclusive access to the location. In an example, a load exclusive from non-shareable memory loads via the memory management unit (MMU) exactly as a regular load from the same location. A load exclusive from shareable memory, however, performs an exclusive read on the AXI bus.

In an example, the STREX primitive may rely on flags. In one embodiment, these are provided in a single register, such as a sequence status (SEQSTAT) register. STREX flags may include the following bits in a SEQSTAT register.

| BIT | NAME | DESCRIPTION | RESET | MODE | VISI-BILITY |
|---|---|---|---|---|---|
| 21 | XMONITOR | Exclusive write monitor. 0 = Open, 1 = Exclusive | 0b0 | R/NW | Public |
| 22 | XACTIVE | Exclusive write active | 0b0 | R/NW | Public |
| 23 | XWAVAIL | Exclusive write response available | 0b0 | R/NW | Public |

Upon successfully completing an LDEX primitive, a DATA register may be updated and the following flag is set.

| Flag | Condition | Value on completion of instruction |
|---|---|---|
| SEQSTAT.XMONITOR | Always updated | 1 |

In an example, if the AXI exclusive read returns an "OKAY" response, the slave does not support exclusive transactions, and an exception may be raised.

In some embodiments, the address must be aligned, even if misaligned accesses are supported generally. An LDEX may cause the following exceptions and errors in addition to those that may be caused by a regular load.

| Condition | Exception or H/W Error |
|---|---|
| Misaligned address | Data access misaligned address violation exception |
| Access to core MMR | Illegal use of supervisor resource |
| Access to memory marked I/O Device Space in CPLB | Data access CPLB protection violation exception |
| AXI exclusive read returns the OKAY response | External memory addressing error |

A STREX_INIT may only modify memory if it has exclusive access to the memory addressed. Thus, the primitive depends on the value of the XMONITOR flag as follows

| Flag | Value on start of instruction | Action |
|---|---|---|
| SEQSTAT.XMONITOR | 0 | CC = 0 |
| SEQSTAT.XMONITOR | 1 | Attempt update(Preg, val), CC = 1, XWACTIVE = 1 |

If the location is non-shareable, then the memory update may be performed as a regular store to that location, except that the core will update SEQSTAT as described below. If the location is shareable the memory update is attempted with an exclusive write on the AXI bus.

In an example, upon completing the STREX_INIT primitive, but not the attempted write, the condition code (CC) flag of an ASTAT register may be modified.

| Flag | Condition | Meaning |
|---|---|---|
| ASTAT.CC | Always Updated | 0 = no write attempted, 1 = write attempted |
| SEQSTAT.XMONITOR | Always Updated | 0 = no write attempted, 1 = write attempted |
| SEQSTAT.XWACTIVE | Only set if write attempted | Exclusive write response pending |

As with the LDEX primitive, in some embodiments, the address must be aligned, even if misaligned accesses are supported generally.

An example STREX_INIT primitive may cause the following exceptions and errors in addition to those that may be caused by a regular store.

| Condition | Exception or H/W Error |
|---|---|
| Misaligned address | Data access misaligned address violation exception |
| Access to core MMR | Illegal use of supervisor resource |
| Access to memory marked I/O Device Space in CPLB | Data access CPLB protection violation exception |
| XWACTIVE = 1 or XWAVAIL = 1 before instruction | Illegal use of supervisor resource? |

The STREX state machine may track the progress of the write transaction and updates the flags in SEQSTAT when it has received a response from the system.

| Flag | Condition | Value on completion of the write transaction | |
|---|---|---|---|
| SEQSTAT.XWAVAIL | Always updated | 1 | Exclusive write response available |

The write response itself may be held in in the MMU as an internal state and provided, for example, as a bus signal. The response is called MMU.XWRESULT by way of example, and is defined as follows.

| MMU.XWRESULT | Meaning |
| --- | --- |
| 0 | AXI exclusive write transaction responded with any value other than EXOKAY |
| 1 | Write was to non-shareable, or AXI exclusive write response was EXOKAY |

The STREX_SYNC primitive synchronizes the processor state with STREX state machine, capturing any pending write response and releasing exclusivity.

If XMONITOR and XWACTIVE are set the instruction stalls until XWAVAIL is set by the STREX state machine. Then if XMONITOR, XWACTIVE, and XWAVAIL are set, the response from the exclusive write is copied to CC.

On completion of the instruction, XMONITOR, XWACTIVE, and XWAVAIL are all cleared, resetting the STREX state machine.

| Flag | Condition | Value on completion of instruction | Meaning |
| --- | --- | --- | --- |
| ASTAT.CC | Only changed if XMONITOR and XWACTIVE and XWAVAIL at start | ? | 0 = write failed, 1 = write succeeded |
| SEQSTAT.XMONITOR | Always updated | 0 | |
| SEQSTAT.XWACTIVE | Always updated | 0 | |
| SEQSTAT.XWAVAIL | Always updated | 0 | |

If the STREX_SYNC primitive is interrupted, the STREX state machine may continue to track the write transaction and update the flags in SEQSTAT in the background.

In an example embodiment, the details of LDEX and STREX may change depending on whether the memory they address is shareable or non-shareable. Shareability may be deduced from memory space and "cacheable protection lookaside buffer" (CPLB) settings. For example, CPLB descriptors in Analog Blackfin® processors define cacheability and protection attributes for given memory pages.

An LDEX or STREX primitive directed a location marked "ILLEGAL" above may cause an exception.

An LDEX or STREX primitive directed to non-shareable memory may succeed but may not be exclusive with respect to other cores. Rather, it may be exclusive only with respect to other threads running on the same core.

An LDEX or STREX directed to shareable memory ensures exclusivity with respect to other cores by using exclusive transactions, for example on an AXI bus.

Turning now to the appended drawings, FIG. 1 is a schematic block diagram of an example digital signal processor (DSP) core 100 according to one or more examples of the present Specification. It should be noted that DSP core 100 is provided as one non-limiting example of a type of processor, and the term "processor" as used throughout this Specification is intended to broadly encompass any combination of hardware, software, or firmware providing programmable logic, including by way of non-limiting example a microprocessor, digital signal processor, field-programmable gate array, programmable logic array, application-specific integrated circuit, or virtual machine processor. DSP core 100 may form part of a larger "computing device," which in various embodiments may include or be part of, by way of non-limiting example, a computer, embedded computer, embedded controller, embedded sensor, personal digital assistant (PDA), laptop computer, cellular telephone, IP telephone, smart phone, tablet computer, handheld calculator, or any other electronic, microelectronic, or microelectromechanical device for processing and communicating data. FIG. 1 has been simplified for the sake of clarity and to better understand the novel concepts of the present disclosure. Thus, additional features may be added in DSP core 100, and some of the features described below may be replaced or eliminated in other embodiments of DSP core 100.

DSP core 100 may include a control unit 110, a memory 120, and a compute array 130. In an example, control unit 110 and compute array 130 constitute a core processor that can perform computation and data processing functions of DSP core 100. Some embodiments of DSP core 100 include other components, such as a microcontroller for executing microcontroller instructions, a direct memory access (DMA) unit, and various interfaces to off-chip devices. Further, although memory 120 is shown here as a single logical block, it should be recognized that memory 120 may include system main

| Memory | Cacheability Properties | Meaning | Shareability |
| --- | --- | --- | --- |
| MMR | any | Core or system MMR | ILLEGAL |
| L1 | any | L1 sram | NON-SHAREABLE |
| L2 | CPLBEN = 0 | CPLB Disabled | SHAREABLE |
| L2 | CPLBBYPASS = 1 | Cache temporarily disabled | SHAREABLE |
| L2 | 000 | Page is non-cacheable memory | SHAREABLE |
| L2 | 001 | Non-cacheable in L2, Write Back Cacheable in L1 | NON-SHAREABLE |
| L2 | 010 | Write Back Cacheable in L2, Non-cacheable in L1 | NON-SHAREABLE |
| L2 | 011 | Write Back Cacheable in L1 and L2 | NON-SHAREABLE |
| L2 | 100 | I/O Device Space | ILLEGAL |
| L2 | 101 | Non-cacheable in L2, Write Through Cacheable in L1 | NON-SHAREABLE |
| L2 | 110 | Write Through Cacheable in L2, Non-cacheable in L1 | NON-SHAREABLE |
| L2 | 111 | Write Through Cacheable in L1 and L2 | NON-SHAREABLE | memory, various levels of on-chip or local memory, cache, and/or other volatile or non-volatile memory technologies.

Control unit 110 facilitates program execution of DSP core 100. Control unit 110 may include an arithmetic logic unit and data address generation (ALU-DAG) unit 112, a program sequencer 114, and a local program memory 116. Control unit 110 may also include other components, such as an instruction cache, a timer, and an instruction register. In an example, ALU-DAG unit 112 supports general purpose integer computations and supplies memory addresses. For example, ALU-DAG 112 provides memory addresses when data are transferred between memory 120 and registers (such as register files of compute array 130, described below). ALU-DAG unit 112 can supply addresses to data memory (for example, memory 120) and/or program memory 116. Program sequencer 114 provides instruction addresses to program memory 116 for instruction fetches. Program memory 116 stores programs that DSP core 100 implements to process data (such as data stored in memory 120) and can also store process data. "Programs," as used throughout this Specification, include any ordered set of executable instructions operable to instruct a processor, such as DSP core 100, to perform a specified task. DSP core 100 may implement programs by fetching the instructions, for example, by retrieving them from memory 120 and loading them into program sequencer 114, decoding the instructions, and providing the decoded instructions to processing elements PE for execution, or executing them locally in ALU-DAG unit 112. In an example, programs may include instruction sets for implementing various DSP algorithms, including algorithms that may be performed in parallel by executing them across two or more processing elements PE, or in single-instruction-multiple-data (SIMD) mode, in which two or more processing elements execute the same instruction, as received from program sequencer 114, on different data elements. SIMD is commonly used, for example, for expeditious processing of large data arrays by dividing the array into n subarrays, and then allowing n processing elements to separately process one subarray each.

Memory 120 stores data to be processed by DSP core 100 (data memory), programs implemented by DSP core 100 to process the data (program memory), or a combination thereof. In some examples, memory 120 may have a multi-banked interleaved memory structure, such that memory 120 includes memory banks M1-Mn, where n is a total number of memory banks of memory 120. In an example, memory 120 is a random access memory, such as a static random-access memory (SRAM), dynamic RAM (DRAM), read-only memory (ROM), flash memory, or other suitable memory technology. In an example, one or more memory banks M are a separate RAM. Alternatively, memory 120 may represent a multi-tiered memory structure, including for example, a fast L1 memory, an intermediate L2 memory, and a slow main memory, wherein the size and cost of each memory may vary inversely with the access speed of the memory. In yet another example, memory 120 may include a cache, or any other suitable type of memory.

A memory management unit (MMU) 132 may be provided to manage memory operations for DSP core 100, and in some examples may be part of a single integrated circuit with DSP core 100. MMU 132 provides memory management services and facilitates communication with memory 120. In some cases, MMU 132 may include or may interface with a direct memory access (DMA) controller to enable DMA operations from DSP core 100 to memory 120. In an example, a STREX state machine such as the one disclosed in FIG. 3 may be programmed into MMU 132 or elsewhere on the core side of memory bus 170-3, while a memory controller included within memory 120 may provide the other end of an exclusive transaction, including monitoring which core of a multi-core system has exclusive access to a location and causing a write transaction to fail if exclusive access has been lost.

By way of example, three buses 170 are shown. As used throughout this Specification, a "bus" includes any interconnection line, network, connection, bundle, single bus, multiple buses, crossbar network, single-stage network, multi-stage network or other conduction medium operable to carry data between parts of a computing device, or between computing devices. In this example, a main system bus 170-1 is provided to communicatively couple DSP core 100 to other system components, as discussed by way of more detailed example in FIG. 2. Computational bus 170-2 communicatively couples compute array 130 to control unit 110. Memory bus 170-3 communicatively couples processing elements PE to memory 120, and in one example is an AXI-compliant bus. It should be noted that these uses are disclosed by way of non-limiting example only, and that some embodiments may omit one or more of the foregoing buses, while others may employ additional or different buses.

Control unit 110 may issue instructions and data addresses to compute array 130 via computational bus 170-2. Computational bus 170-2 transfers addresses for instructions and data to various processing elements PE of compute array 130. Memory bus 170-3 may transfer data and/or instructions from memory (such as memory 120, program memory 116, other memory, or a combination thereof), such that contents of any register in DSP core 100 can be transferred to any other register or to any memory location and memory 120 can provide data operands (values) to compute array 130.

In the example shown in FIG. 1, compute array 130 includes four processing elements PE1-PE4. In other embodiments, compute array 130 may include zero or more discrete processing elements. Processing elements PE perform numeric processing, and in an example, may include specialized hardware for carrying out specific types of computations such as DSP algorithms. Processing elements PE may operate independently, in parallel, or as an SIMD engine. In the present example, each processing element PE may be a vector processor. Alternatively, processing elements PE may be scalar processors, or a combination of scalar processors and vector processors.

Processing elements PE each include a respective computation unit (CU) 152. In the depicted embodiment, computation units 152 may be identical, although the present disclosure contemplates embodiments where computation units 152 are not identical. The present disclosure further contemplates configurations where one or more processing elements PE do not include a computation unit 152. In the present example, computation units 152 each include an arithmetic logic unit (ALU), a multiplier-accumulator (MAC), a shifter, other computational unit, or combinations thereof. An ALU can perform arithmetic and logic operations, such as add, subtract, negate, increment, decrement, absolute value, AND, OR, EXCLUSIVE OR, NOT, divide primitive, other arithmetic operations, other logic operations, or combinations thereof. An example MAC can perform multiplication operations as well as multiply and accumulate operations, such as single-cycle multiply, multiply/add, multiply/subtract other operations, or combinations thereof. A shifter can perform logical and arithmetic shifts, bit manipulations, normalization, denormalization, derive-exponent operations, other operations, or combinations thereof. The various arithmetic operations, logic operations, and other operations can be performed on both fixed-point and floating-point formats. In various embodiments, the ALU, MAC, and/or shifter include registers associated therewith.

Processing elements PE may also each include a respective register file 154. In the depicted embodiment, register files 154 may be identical, although the present disclosure contemplates embodiments where register files 154 are not identical. The present disclosure further contemplates configurations where one or more processing elements PE do not include a register file 154. Register files 154 include registers that transfer data between processing elements PE and memory bus 170-3 and stores results. In the present example, register files 154 can include a respective general purpose register set 155 that include general purpose registers having widths dependent on design requirements of DSP core 100, such as 32-bit general purposes registers, 40-bit general purpose registers, 64-bit general purpose registers, 128-bit general purposes registers, other width general purpose registers, or a combination thereof. For purposes of the following discussion, general purpose registers 155 include 32-bit general purpose registers. In one example, register files 154 each include a respective STREX register, which may be configured to hold flags and/or values related to the STREX primitives described herein. Register files 154 can include additional registers according to design requirements of DSP core 100. Further, in various implementations, STREX registers 158 may be general purpose registers 154 from general purpose register sets 155. In one example embodiment, each PE includes at least one dedicated STREX register 158 that is 32-bits wide. In other embodiments, each PE may include a plurality of STREX registers 158. In yet another example, processing elements PE do not contain separate STREX registers 158, but rather ALU-DAG unit 112 includes a master STREX register 158 applicable to the whole of DSP core 100.

DSP core 100 can perform various parallel operations. For example, during a single cycle, processing elements PE may access an instruction (via interconnection network 142) and access N data operands from memory (via memory bus 170-3) for synchronous processing. In SIMD mode, DSP core 100 may process multiple data streams in parallel. For example, when in SIMD mode, DSP core 100 in a single cycle may dispatch a single instruction to each or a plurality of processing elements PE via computational bus 170-2; load N data sets from memory (memory 120, program memory 116, other memory, or a combination thereof) via memory bus 170-3, one data set for each processing element PE (in an example, each data set may include two data operands); execute the single instruction synchronously in processing elements PE; and store data results from the synchronous execution in memory 120.

Figure 1A:
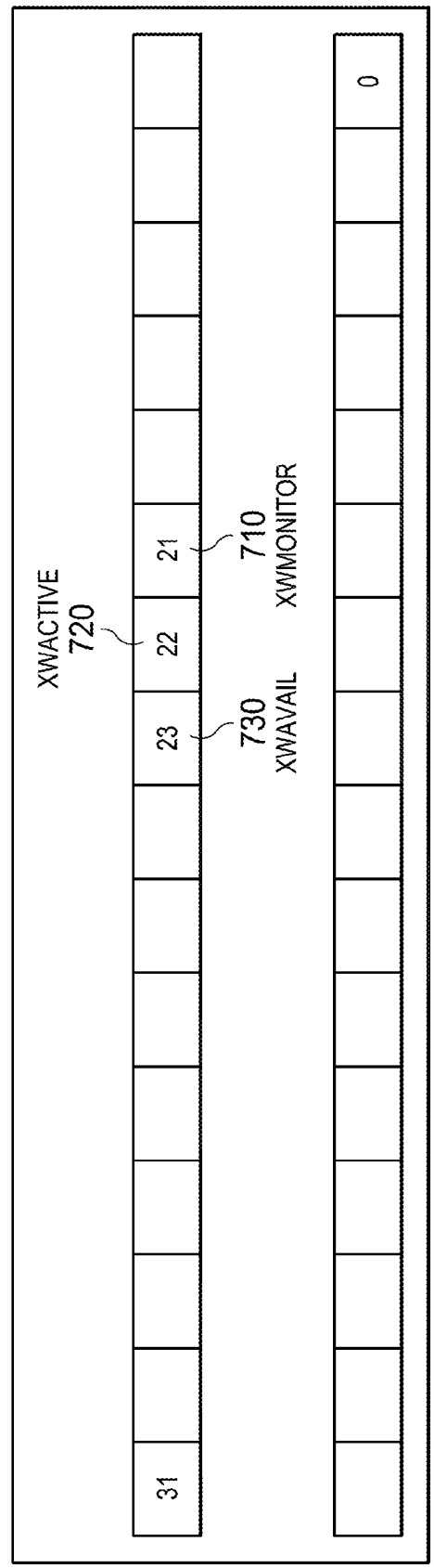
FIG. 1A is a block diagram of a STREX register according to one or more examples of the present Specification.

FIG. 1A is a block diagram of an example STREX register 158 according to one or more examples of the present Specification. In one example, DSP core 100 is an Analog Devices, Inc. Blackfin® DSP, wherein STREX flags are contained within the sequencer status (SEQSTAT) register, so that in this example, Blackfin® SEQSTAT is considered STREX register 158. SEQSTAT is configured to contain information about the current state of the Blackfin® sequencer, as well as diagnostic information from a last event. In the example, SEQSTAT is read-only from a programmer's perspective. DSP core 100 may be configured so that any reset of SEQSTAT, including a soft reset, may return the register to the value 0b0000 0000.

Bits 0-20 and 24-32 of SEQSTAT may be reserved or allocated to other purposes, such as containing a value for a last executed exception, hardware error identification, or a flag identifying the cause of the last reset of DSP core 100.

Figure 3:
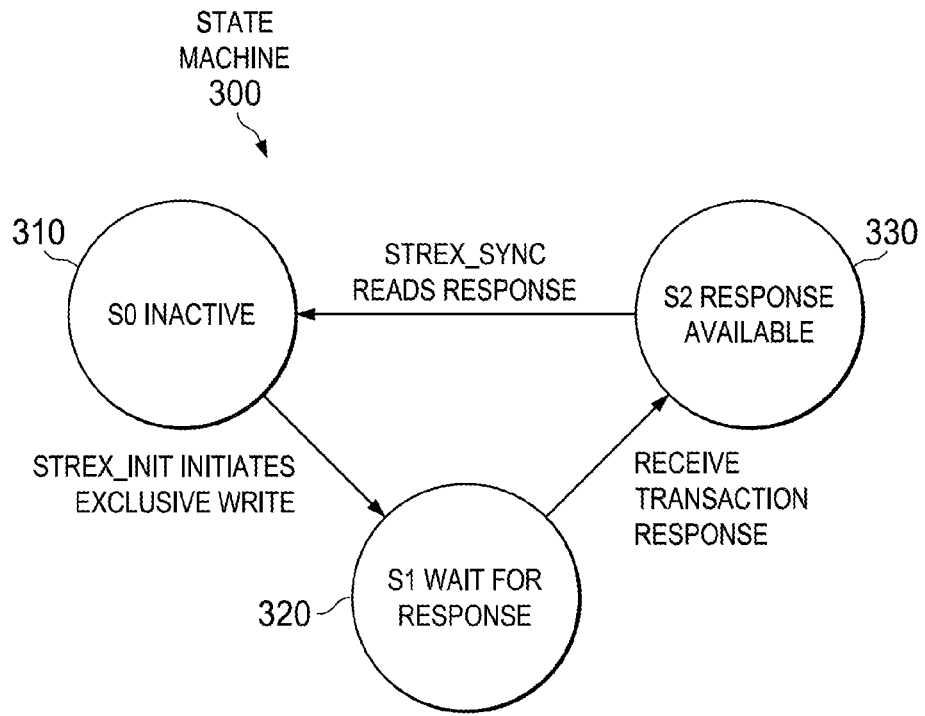
FIG. 3 is a block diagram of a STREX state machine according to one or more examples of the present Specification.

In this example, bits 21, 22, and 23 are dedicated to STREX flags, providing values necessary to advance the state machine described with more particular detail in connection with FIG. 3. The following table describes the value and purpose of each flag. It should be noted, however, that this configuration is provided as an example only, and is not intended to be limiting.

| BIT | NAME | DESCRIPTION | RESET | MODE | VISI-BILITY |
|---|---|---|---|---|---|
| 21 | XMONITOR | Exclusive write monitor. 0 = Open, 1 = Exclusive | 0b0 | R/NW | Public |
| 22 | XACTIVE | Exclusive write active | 0b0 | R/NW | Public |
| 23 | XWAVAIL | Exclusive write response available | 0b0 | R/NW | Public |

As seen in this table, bit 21 is called XMONITOR 710, and is used to flag whether an atomic pair of exclusive read and exclusive write transactions has been interrupted. DSP core 100 may set this flag to 0b1 after initiating LDEX primitive and reset this flag to 0b0 when an interrupt is taken or if an STREX primitive has successfully completed. DSP core 100 may test this flag before attempting to an exclusive write transaction. If the flag is 0b0, the atomic pair has been interrupted and the core will not initiate the exclusive write transaction. This flag operates in read-only (no-write) mode, meaning that a programmer cannot manipulate this flag directly, but can use its value in the program flow. The flag is publicly visible, meaning that it forms part of the architectural state of DSP core 100 and a programmer can read the value by testing the appropriate bit in the STREX register.

Bit 22 is called XACTIVE 720, and is used to flag whether an exclusive write operation is currently active. DSP core 100 may set this flag when an exclusive write is initiated, and may clear it when the exclusive write is finished. A reset of this flag returns its value to 0b0. This flag operates in read-only (no-write) mode, meaning that a programmer cannot manipulate this flag directly, but can use its value in the program flow. The flag is publicly visible, meaning that it forms part of the architectural state of DSP core 100 and a programmer can read the value by testing the appropriate bit in the STREX register.

Bit 22 is called XWAVAIL 730, and is used to flag whether STREX response is available. DSP core 100 may set this flag when STREX primitive finishes, either successfully or unsuccessfully, and may clear it after the response has been read into a register or status bit of DSP core 100. A reset of this flag returns its value to 0b0. This flag operates in read-only (no-write) mode, meaning that a programmer cannot manipulate this flag directly, but can use its value in the program flow. The flag is publicly visible, meaning that it forms part of the architectural state of DSP core 100 and a programmer can read the value by testing the appropriate bit in the STREX register.

DSP core 100 may also use a value such as MMU.XWRESULT, which stores the actual result of the STREX operation. In some embodiments, MMU.XWRESULT may be encoded in another bit of STREX register 158. In one example, MMU.XWRESULT is not stored in a register, but rather is encoded by memory bus 170-3 itself. Memory bus 170-3 may set MMU.XWRESULT on completion. In this example, a value of 0b1 may represent a successful STREX operation, while a value of 0b0 may represent a failed STREX operation.

Figure 2:
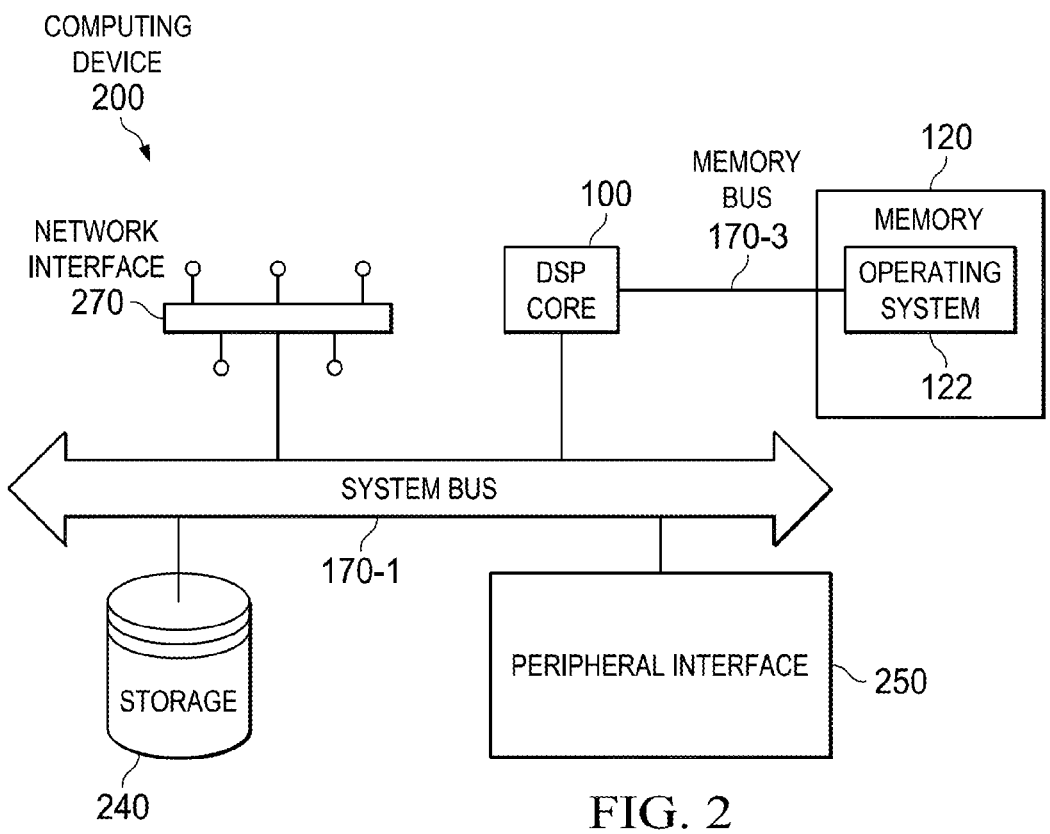
FIG. 2 is a block diagram of a computing device 200 according to one or more examples of the present Specification.

FIG. 2 is a block diagram of a computing device 200 according to one or more examples of the present Specification. As described with reference to FIG. 1, computing device 200 includes a DSP core 100 communicatively coupled to a system bus 170-1 and a memory bus 170-3. Memory bus 170-3 communicatively couples DSP core 100 to memory 120, which has loaded therein an operating system 122 providing low-level services for application software. This Specification contemplates, however, embodiments wherein a traditional operating system 122 may be unnecessary, such as in embedded systems or controllers, wherein applications may run on "bare metal."

A storage 240 may communicatively couple to DSP core 100 via system bus 170-1. Storage 240 may be a species of memory 120. In some embodiments, memory 120 and storage 240 may be separate devices, with memory 120 being a relatively low-latency volatile memory device, and storage 240 being a relatively high-latency non-volatile memory device. Storage 240 may also be another device, such as a hard drive, solid-state drive, external storage, redundant array of independent disks (RAID), network-attached storage, optical storage, tape drive, backup system, cloud storage, or any combination of the foregoing. Storage 240 may be, or may include therein, a database or databases or data stored in other configurations. Many other configurations are also possible, and are intended to be encompassed within the broad scope of this Specification. In an example, program execution involves loading instructions from storage 240 into memory 120. Instructions are then fetched into DSP core 100 for execution. Data may also be loaded from storage 240 into memory 120 for availability to DSP core 100 during program execution.

A network interface 270 may communicatively couple to DSP core 100, and may be operable to communicatively couple DSP core 100 to a network. In this Specification, a "network" includes any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

A peripheral interface 250 communicatively couples to DSP core 100 via system bus 170-1, and may be operable to communicatively couple DSP core 100 to one or more peripherals. As used in this Specification, a "peripheral" includes any auxiliary device that connects to computing device 200 but that is not necessarily a part of the core architecture of computing device 200. A peripheral may be operable to provide extended functionality to computing device 200, and may or may not be wholly dependent on computing device 200. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Note that the components described in FIG. 2 are provided by way of example only, and are not intended to limit computing device 200 to the particular configuration shown. Any component of FIG. 2 may be omitted in appropriate circumstances, while in other appropriate circumstances, any component may be duplicated as necessary, or combined with another component. For example, it is common for system bus 170-1 and memory bus 170-3 to be the same bus. In another example, network interface 270 may be used to provide connectivity to certain peripherals, so that the function of peripheral interface 250 is subsumed therein. Thus, it should be understood that the division between components herein is not intended to imply a necessary or strict physical division. Rather, components are divided according to logical functions, and where appropriate, a single device may perform a plurality of functions. In one example, computing device 200 may be provided, in its entirety, as a system-on-a-chip (SoC), wherein some or all of the functions disclosed herein may be provided in a single monolithic semiconductor device.

To allow for interrupt handling, a STREX instruction may be divided into two instructions: store exclusive initialize (STREX_INIT) and store exclusive synchronize (STREX_SYNC). FIG. 3 is a block diagram of a STREX state machine 300 according to one or more examples of the present Specification. In an example, STREX state machine 300 is implemented in hardware in MMU 132, or otherwise on the core side of memory bus 170-3, and continues to track the progress of STREX primitive even if the STREX_SYNC primitive is interrupted. State machine 300 begins in state S0 310, which is an active. To advance from state S0 310, a STREX_INIT instruction initiates an exclusive write transaction on memory bus 170-3, advancing the state machine to state S1 320. In state S1 320, DSP core 100 waits for a response from the STREX primitive. Notably, and contrary to the practice in at least some prior art processors, state S1 320 is interruptible. Thus, interrupts need not be locked out during state S1, which may take an indeterminate time, and which may take long enough to adversely affect system performance. If an interrupt is received during state S1 320, operating system 122 may handle the interrupt according to its standard procedures, while state machine 300 continues to execute in parallel to the any instructions or other primitives running on DSP core 100. On receiving a transaction response from memory bus 170-3, state machine 300 advances from state S1 320 to state S2 330. State S2 330 represents a condition where a response is available. This means that the response is ready to be read within a determinate number of clock cycles. To advance from state S2 330 back to state S0 310, a STREX_SYNC instruction reads the response.

Figure 4:
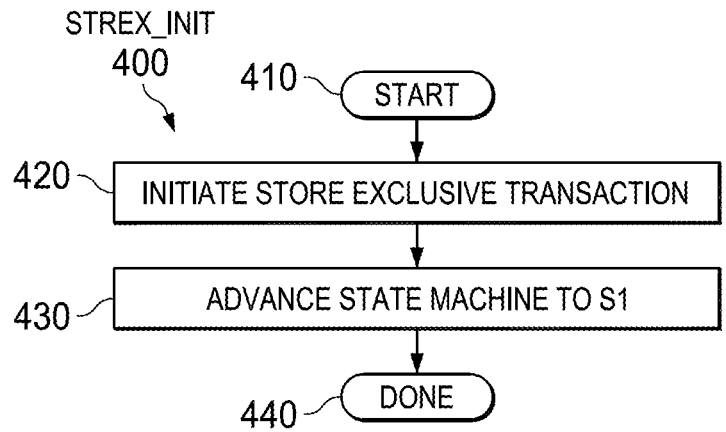
FIGS. 4-5 are flow diagrams of STREX_INIT and STREX_SYNC primitives according to one or more examples of the present Specification.
Figure 5:
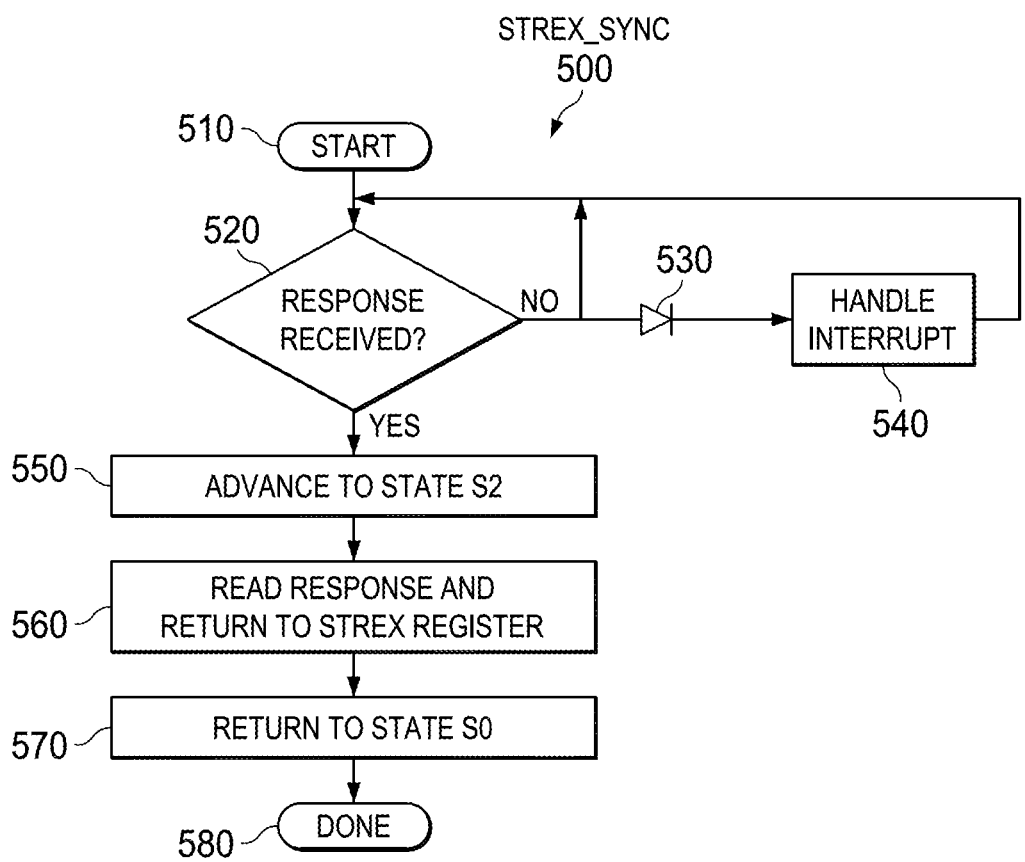

FIG. 4 and FIG. 5 are flow diagrams of STREX_INIT and STREX_SYNC primitives according to one or more examples of the present Specification. In an example, STRE_INIT and STREX_SYNC interact with state machine 300 of FIG. 3. It should be noted that several flow diagrams are disclosed throughout this Specification, and it should be understood that each is provided to present only one example method of operating on a particular machine, transforming matter, or otherwise achieving a useful result. The steps are presented in a particular order by way of example only, and those versed in the art will easily recognize that many combinations and variations on the disclosed method are possible. In some cases, certain steps may be combined with other steps or eliminated entirely without departing from the scope of the method disclosed, and in some cases certain additional or intervening steps may be provided between the disclosed steps. Furthermore, the disclosed steps needs not be in the order disclosed or in any particular order, except where expressly stated or where clear in context.

FIG. 4 is a flow diagram of a STREX_INIT primitive 400 according to one or more examples of the present Specification. In one example, STREX_INIT is a hardware instruction implemented in DSP core 100. STREX_INIT primitive 400 starts in block 410. In block 420, STREX_INIT 400 initiates a STREX primitive, for example by placing data on memory bus 170-3 to be written out to memory 120. In block 430, STREX_INIT primitive 400 advances state machine 300 to state S1 320 to wait for a response from the STREX transaction. In block 440, STREX_INIT primitive 400 is done.

FIG. 5 is a flow diagram of a STREX_SYNC primitive 500 according to one or more examples of the present Specification. In one example, STREX_SYNC is a hardware instruction implemented in DSP core 100. STREX_SYNC primitive 500 starts in block 510. In block 520, STREX_SYNC primitive 500 enters a loop that continuously checks for whether state machine 300 has advanced to state S2, indicating that a response from STREX_INIT is available. If a response is not been received, control loops back around to block 520. Importantly, the loop of block 520 is interruptible. For example, if interrupt 530 is received, then control passes to block 540, in which operating system 122 may handle interrupt 530 according to its normal procedures. After handling interrupt 530, operating system 122 may restart STREX_SYNC 500, so that operation of the primitive resumes at block 510, proceeds to block 520, and continues waiting for a response. When a response is received, state machine 300 advances to state S2 330. In an example, STREX_SYNC 500 detects that state machine 300 has advanced to state S2 550, and proceeds to block 560. In block 560, STREX_SYNC 500 reads the response and returns it to STREX register 158. In block 570, state machine 300 returns to state S0 310. In block 580, STREX_SYNC primitive 500 is done.

Figure 6:
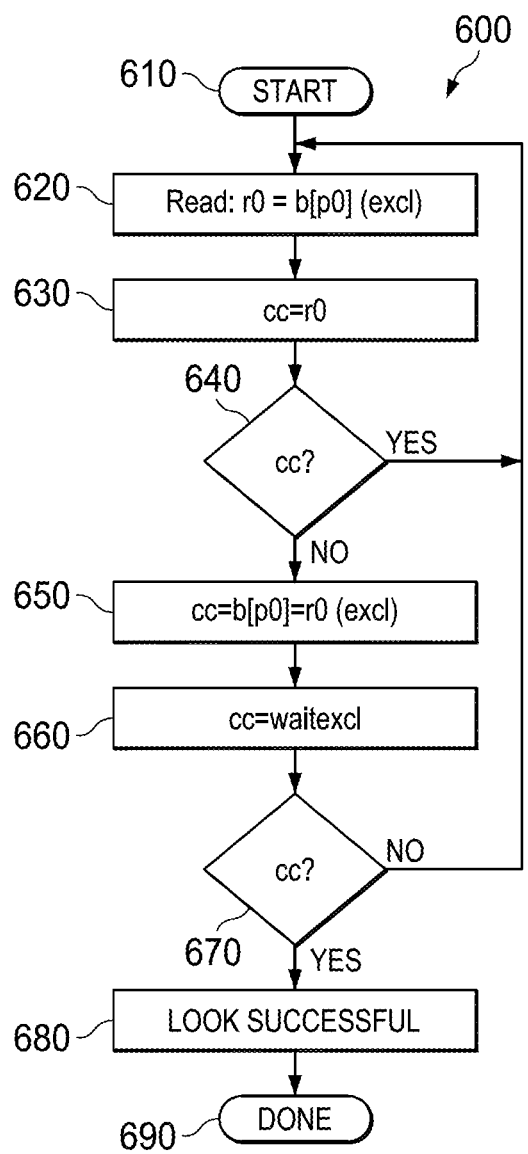
FIG. 6 is a flow diagram of a use case of LDEX and STREX primitives according to one or more examples of the present Specification.

FIG. 6 is a flow diagram of a use case of LDEX and STREX primitives according to one or more examples of the present Specification. The example here may replace known TEST-SET instructions, which rely upon AXI locked transactions.

In a "spinlock" operation, a thread that needs exclusive access to a resource (such as a semaphore, for example) continuously checks whether the resource is locked ("spins") until a lock is achieved. Pseudocode for an example spinlock operation using the LDEX and STREX primitives of the present Specification is disclosed below. In this example, the spinlock is used to access a semaphore. R1 is a register containing the "lock" value (1). P0 is an address register containing the address of a memory location containing a one-byte lock flag for the resource (0b1=locked, 0b0=unlocked), with b[P0] representing a byte-size access to P0. CC is a condition code flag, which may be used to check the success or failure of an operation to control branching, and may be a conditional status bit that may be found in a status register. In the example where DSP core 100 is a Blackfin® DSP, a "CC" bit is found in the arithmetic status (ASTAT) register, which is a 32-bit register containing a plurality of status flags, including the "Condition Code" (CC) flag used to hold the result of some arithmetic comparisons. R0 is a register for holding the value of B[P0] after a read operation.

```
R1 = 1;    // "1" MEANS "LOCKED"SPIN:
R0 = B[P0] (Z,EXCL);    //LDEX
CC = (R0==0);    //IS SEMAPHORE UNLOCKED?
IF !CC JUMP SPIN;    // NO - TRY AGAIN
CC = (B[P0] = R1)   (EXCL);   // TRY TO LOCK WITH STREX_INIT
IF !CC JUMP SPIN;    //LOCK FAILED. TRY AGAIN
```

-continued

```
CC = SYNCEXCL;   // STREX_SYNC WAIT FOR WRITE AND
                    COPY TO CC
IF !CC JUMP SPIN;   // STREX FAILED. TRY AGAIN
    ...
    //SUBSTANTIVE CODE
    ...
R1 = 0;   // UNLOCKED VALUE
B[P0] = R1;    // UNLOCK
```

In another example, the STREX primitive is called in context switching code to clear any exclusive transactions and to preserve the result of any store exclusive in the CC bit of the preserved ASTAT register. For example:

```
// CONTEXT SWITCH
CC = SYNCEXCL;    //STREX_SYNC
[--SP] = ASTAT;    // SAVES STORE EXCL RESULT
                    // IF ONE WAS PENDING
```

Interrupt handlers that are known not to use exclusive operations may leave the exclusive state unmodified. Any pending exclusive write operations will complete and update the state in SEQSTAT which will be read by STREX_SYNC on return from the handler code.

Turning to method 600 of FIG. 6, the spinlock procedure starts in block 610. Block 620 includes a label "READ:" which is used as a reference point for jump instructions. In block 620, a processing element such as PE1 of FIG. 1 performs an LDEX primitive, which in this case is an exclusive read instruction. Specifically, PE1 loads the current value of B[P0] into R0, preparatory to checking whether B[P0] is locked.

In block 630, PE1 assigns the value of R0 to condition code CC. According to this step, CC receives the value of the lock code.

In block 640, the lock code is checked. If the lock code is 0b1 then another process has a lock on the resource. Control may then return to block 620, thus "spinning" the check for an unlocked resource.

If block 640 reaches a condition where the resource is unlocked, then control passes to block 650. In block 650, PE1 executes a STREX_INIT primitive to assign the value in R1, which should now be 0b1, to B[P0] to gain a lock on the resource. The return value of this operation is assigned to CC, indicating whether the STREX_INIT initiated a write transaction.

In block 660, PE1 executes a STREX_SYNC primitive to test whether the write transaction successfully wrote 0b1 out to B[P0]. If the atomicity of the operation is not broken by an intervening interrupt, then MMU.XWRESULT will return 0b1 ("SUCCESS"), which is then assigned to CC.

In block 670, if CC is 0b0, then an intervening operation has broken the atomicity of the STREX operation. In that case, control passes back to block 620 to again try to acquire a valid lock on the resource.

If control passes to block 680, the lock is successful and in block 690 the process ends. After block 690, the substantive code that required the lock in the first place may be run, and then the lock may be cleared.

If control passes smoothly and linearly from block 610 to block 690, then a lock was acquired without any incidents. In certain known systems, system interrupts would be locked out throughout the entirety of blocks 620 to 670. This may, however, be unacceptable in certain systems, including real-time systems, where predictable timing and predictable handling of interrupts is more important. In those cases, the LDEX and STREX primitives of the present Specification provide interruptible operations. In other known systems, interrupts would be locked out for the duration of block 650 and 660 this may also be unacceptable in certain systems due to the unpredictable timing of the write transaction.

In one example, the LDEX primitive of block 620 takes an indeterminate number of cycles but may be safely interrupted and restarted because the primitive returns the system to the state however many times it is executed. The assignment operation of block 630 takes a determinate number of clock cycles, so needs not be interruptible to provide a determinate number of cycles before an interrupt can be handled. But an interrupt may occur between block 620 and block 630. Note that the LDEX primitive of block 620 set the flag XMONITOR to the value 0b1, while XWACTIVE and XWAVAIL both remain at their default value of 0b0. This may cause an internal "abort" mechanism within the STREX primitive to activate because the atomicity of the operation has been breached. If, after returning from the interrupt, the process loops back to block 620, the LDEX primitive will reset the flags XMONITOR, XWACTIVE, and XWAVAIL, and the process will continue as normal. If, however, control passes to block 650, the STREX_INIT primitive will recognize that the atomicity of the procedure has been breached and will enter a "no operation" (NOP) state wherein it performs no useful work but may reset XMONITOR, XWACTIVE, and XWAVAIL to their default values of 0b0 and set CC to indicate failure. STREX_SYNC will also perform a NOP state in block 660 in which case it does not modify CC, and in block 680, control will pass back to block 620.

In another example, an interrupt occurs between block 630 and block 640. Again, in this case the abort mechanism will take over because XMONITOR is 0b1 while XWACTIVE and XWAVAIL are 0b0. Thus, STREX_INIT and STREX_SYNC will both execute their NOP states, and at block 680, control will pass back to block 620.

The behavior of STREX_INIT is controlled by the following pseudocode:

```
IF(XMONITOR == 0) {
    // NOP STATE
    CC = 0
    //WRITE NOT SENT TO MMU
} ELSE {
    CC = 1
    XWACTIVE = 1
    //WRITE SENT TO MMU
}
```

Restated, if the XMONITOR flag is now set to its default value of 0b0, STREX_INIT can infer that the intervening interrupt performed at least one exclusive operation, thus breaking atomicity of the operation. If that is the case, CC is forced to zero and the NOP state is executed so that control will pass back to block 620.

On the other hand, if XMONITOR is still 0b1, then PE1 can infer that an intervening interrupt did not perform any exclusive operations, and thus atomicity has been preserved. In that case, CC is set to 0b1 and XWACTIVE is set to 0b1 and XMONITOR remains set to 0b1 so that the STREX_SYNC operation in block 660 executes normally.

The STREX_SYNC primitive may be used after a STREX_INIT as in block 660, or it may be used in an interrupt handler to abort an atomic sequence should the interrupt occur between block 620 and block 660, or to read the STREX_INIT response and save it in the thread context if the interrupt occurred between block 650 and block 660 or during block 660. The behavior of STREX_SYNC is controlled by the following pseudocode:

```
IF(XMONITOR == 0) {
        //NOP DO NOT MODIFY CC
        XWAVAIL = 0
        XWACTIVE = 0
    } ELSE {
        IF{XWACTIVE) {
            //WATCH MMU STATE MACHINE
            WHILE(XWAVAIL == 0) { }
            CC = MMU.XWRESULT
            XMONITOR = 0
            XWAVAIL = 0
        } ELSE IF(XWAVAIL) {
            CC = MMU.XWRESULT
            XMONITOR = 0
            XWAVAIL = 0
        } ELSE {
            //ABORT
            XMONITOR = 0
            XWACTIVE = 0
            XWAVAIL = 0
        }
    }
```

In the first condition, if XMONITOR is set to 0b0, then STREX_SYNC may infer that no exclusive write transaction is in progress. Either the STREX_SYNC is being executed in an interrupt handler which is not interrupting an atomic LDREX/STREX sequence, or STREX_SYNC follows a STREX_INIT which executed in NOP mode, or STREX_SYNC follows a STREX_INIT which initiated an exclusive write transaction but an intervening interrupt has executed a STREX_SYNC to copy the transaction response into CC. In all cases CC already contains the desired value and STREX_SYNC executes its NOP state and sets the flags XWAVAIL and XWACTIVE to their default values of 0b0. CC is not changed. If the STREX_SYNC is in an interrupt handler but an atomic sequence is not being interrupted then the current value of CC must be preserved as part of the thread context. If the STREX_SYNC follows a STREX_INIT which executed in NOP mode, that operation will already have set CC to 0b0. If the STREX_SYNC follows a STREX_INIT but an intervening interrupt has executed a STREX_SYNC to copy the transaction response into CC, then CC already contains the transaction response.

In the second condition, if XMONITOR is 0b1 and the XWACTIVE flag is set to 0b1, then STREX_SYNC continues to perform its normal function: it watches the XWAVAIL flag until it flips to a 0b1 value, at which point CC receives the value of MMU.XWRESULT from memory bus 120. STREX_SYNC then resets XMONITOR and XWAVAIL to their default values of 0b0 and exits.

In the third condition, if XMONITOR is 0b1, XWACTIVE is 0b0, and XWAVAIL is 0b1, then the write request has finished, clearing the XWACTIVE flag and setting the XWAVAIL flag. In this case, CC receives the value of MMU.XWRESULT, and XMONITOR and XWAVAIL are both reset to their default value of 0b0.

In any other case, an unexpected error condition has occurred and an ABORT state is entered. The ABORT state may, for example, throw an exception or may provide some other error mechanism. XMONITOR and XWACTIVE are both reset to the default value of 0b0. [Again, why not XWAVAIL?]

A truth table of the example method is as follows, in which "M" represents XMONITOR, "P" represents "XWACTIVE" (pending) and "A" represents "XWAVAIL":

| Case | M | P | A | Behavior |
|------|---|---|---|----------|
| 1 | 0 | X | X | NOP Case |
| 2 | 1 | 0 | 0 | ABORT case: Clear state |
| 3 | 1 | 0 | 1 | XWAVAIL case. Read result, clear state. |
| 4 | 1 | 1 | 0 | XWACTIVE case: Poll XWAVAIL until it is set. |
| 5 | 1 | 1 | 1 | Illegal and impossible because XWACTIVE is cleared when XWAVAIL is set. |

In summary, if XMONITOR==0b0, then no atomic operations are pending, and the STREX primitives may be in a NOP state. Meaning, that if they are called, they simply execute NOP. In case 2, an interrupt has occurred between LDEX and before STREX_INIT. In that case, XMONITOR is set to 0b0, and CC is not changed. Setting XMONITOR=0 means that the next STREX_INIT will not initiate an exclusive write, so this is an abort case.

Case 3 implies that STREX_SYNC has finished, and the result is available to be read. Case 4 implies that STREX_SYNC is still pending, so XWAVAIL should be polled until it is set. Case 5 should not occur, because XWACTIVE is cleared when XWAVAIL is set. Thus, in a properly-implemented architecture, case 5 will never occur.

On reaching block 670, CC will contain 0b1 if a write was attempted and the response in MMU.XWRESULT was 0b1 indicating the write successfully updated the memory location, the process loops back to block 620 or not, depending on the value of CC.

Figure 7:
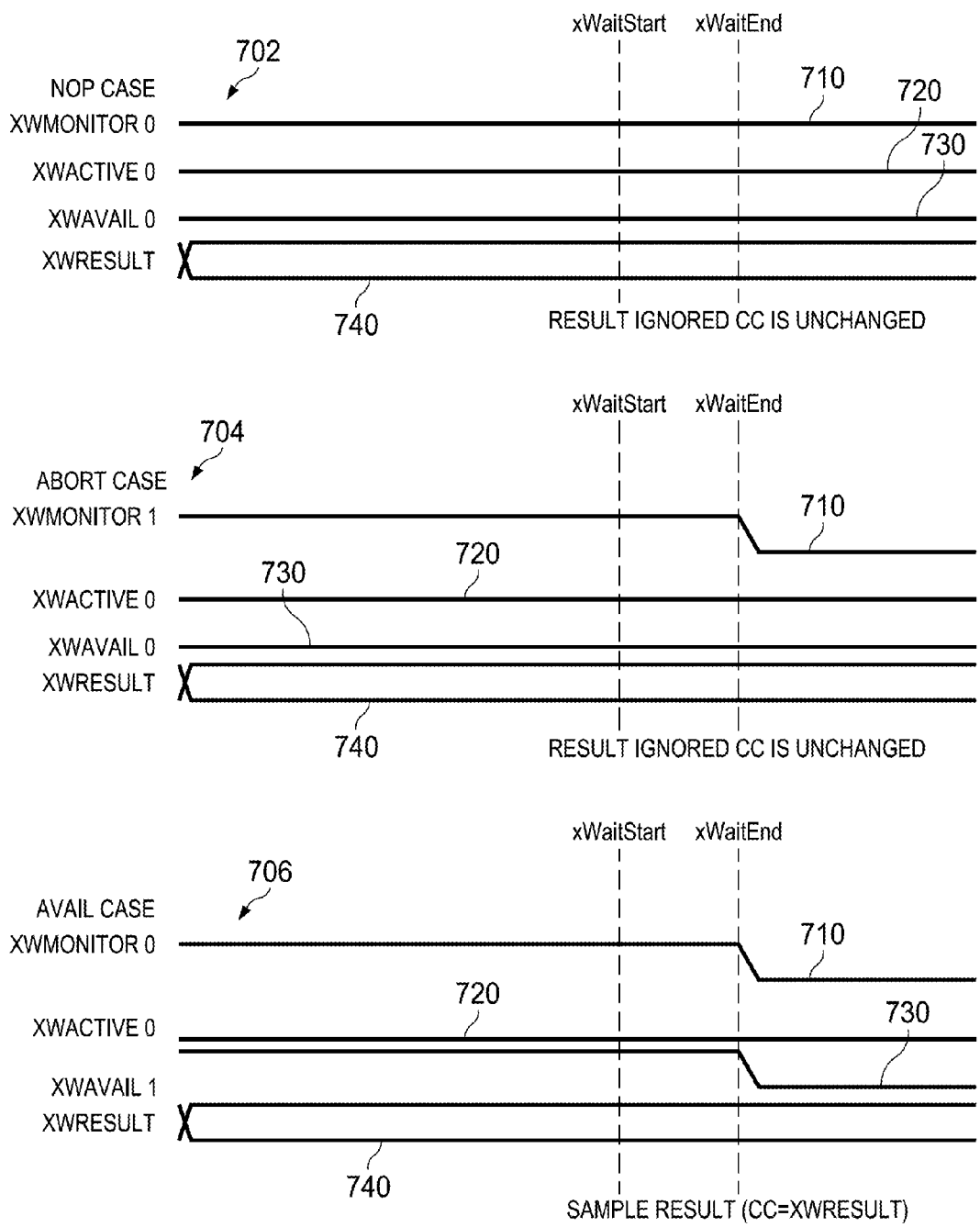
FIG. 7 and FIG. 7A are signal timing charts of the truth table disclosed in connection with FIG. 6 according to one or more examples of the present specification.
Figure 7A:
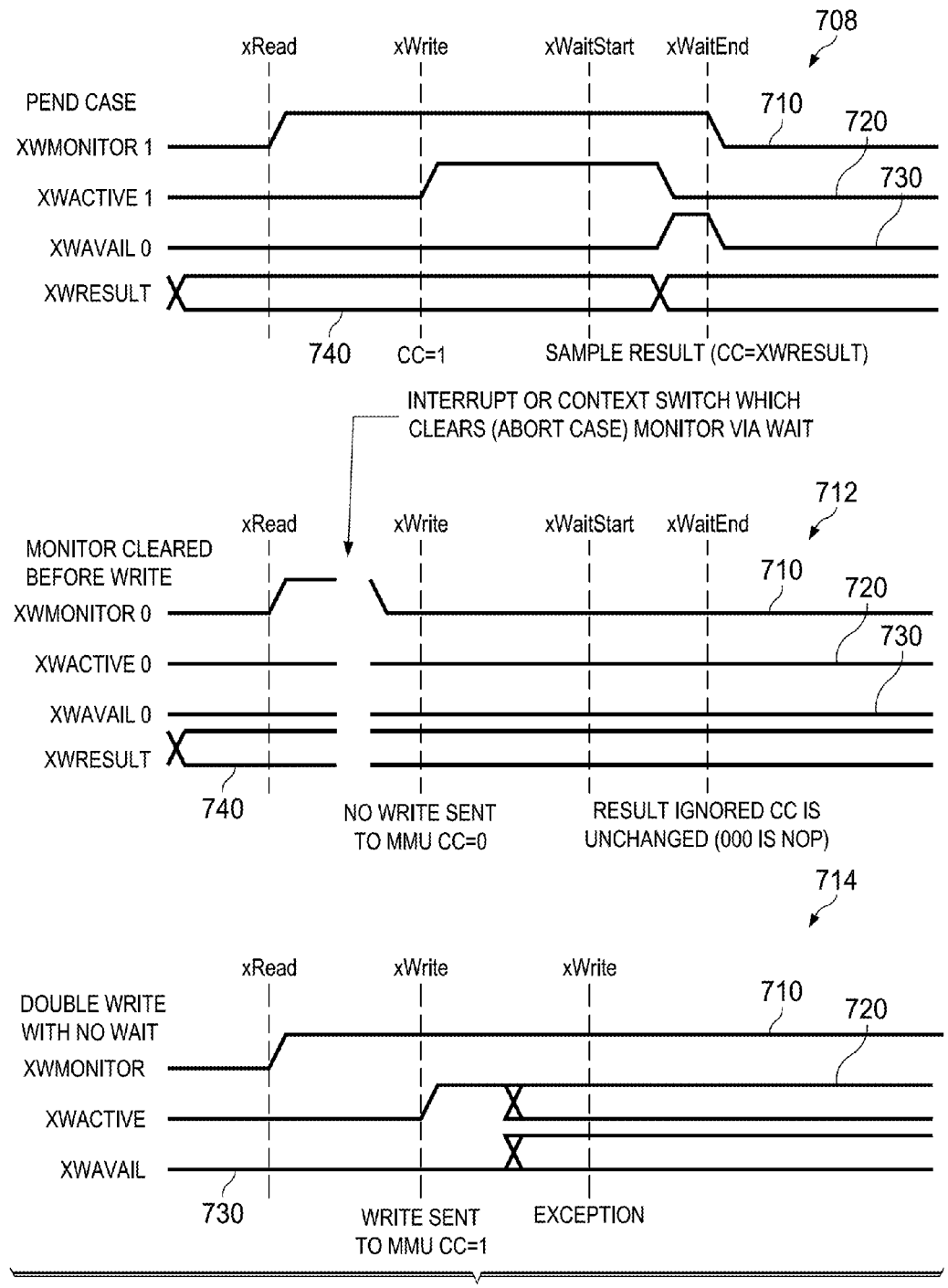

FIG. 7 and FIG. 7A are signal timing charts of the truth table disclosed in connection with FIG. 6. It should be noted that the signal names disclosed in the chart are provided to correspond exactly to the flags that they set. In some embodiments, however, signals may have different names from the flag, and they are presented here with identical names only to simplify discussion. In the disclosed example, timing for flag signals XMONITOR, XWACTIVE, and XWAVAIL are disclosed, along with timing for data signal MMU.XWRESULT. The span between time cursors xWaitStart and xWaitEnd represents the duration of a STREX_SYNC primitive.

In FIG. 7 and FIG. 7A, signal XMONITOR 710, XWACTIVE 720, XWAVAIL 730, and XWRESULT 740 are used by way of illustration. In the truth table above, example 1 corresponds to graph 702, example 2 corresponds to graph 704, example 3 corresponds to graph 706, example 4 corresponds to graph 708, and example 5 corresponds to graph 712. Graph 714 represents a case of a programmer incorrectly attempting a second STREX_INIT primitive before the preceding STREX primitive completes, and is not part of the truth table.

Example case 1 702 is a NOP case, in which all three flags remain at zero. Because no data operation takes place, XWRESULT receives no data.

Example case 2 704 is an ABORT case, in which XWMONITOR is set to 0b1 and XWAVAIL is set to 0b0, but at the end of the STREX_SYNC, XWMONITOR is reset to 0b0 because the STREX_SYNC is executed between a LDEX and STREX_INIT, for instance in an interrupt handler. The abort procedure is described in more detail above.

Example 3 706 represents an XWAVAIL case. Here, at the end of the STREX_SYNC, XWAVAIL and XMONITOR are both set to 0b0 because the value of MMU.XWRESULT has been read into CC.

In FIG. 7A, two new cursors are introduced, namely xRead representing the invocation of an exclusive read, or LDEX primitive, and xWrite, representing the invocation of an exclusive write or STREX_INIT primitive.

Example 4 708 represents the XWACTIVE case. In this case, at xRead, XMONITOR goes high, meaning that an LDEX was successfully performed. At xWrite, a STREX_INIT is performed and XWACTIVE goes high, indicating that the STREX primitive is attempting to write an exclusive value. At xWaitStart the STREX_SYNC primitive finds XWACTIVE is high so waits until XWAVAIL goes high indicating the write response is in MMU.XWRESULT. At xWaitEnd the STREX_SYNC primitive copies MMU.XWRESULT into CC and sets XWMONITOR and XWAVAIL low.

In example 5 712, XMONITOR is set during the LDEX primitive, but an interrupt or context switch occurs before the STREX procedure is executed. In that case, at xWrite, all three flags are 0b0 and STREX executes its NOP state.

In example 6714, an xRead, which sets XMONITOR, is followed by a first xWrite, which sets XWACTIVE. However, before the process is complete, a second xWrite is attempted. This may be the result, for example, of a programming error. In this case, a user error has occurred, so the STREX primitive may abort and throw an exception.

Advantageously, according to one or more embodiments of the present Specification, two threads performing exclusive memory operations may be implemented on the same processing element PE, regardless of memory type. In this case, two threads can only race for the same lock if there is a context switch between the load exclusive and store exclusive:

| Thread | Instruction | XMONITOR | XWAVAIL | MMU.XWRESULT | CC |
|--------|-------------|----------|---------|--------------|----|
|        |             | 0 | 0 | 0 | a |
| 0 | R0 = b[P0] (z, excl) | 1 | 0 | 0 | a |
| system | CC = syncexcl | 0 | 0 | 0 | a |
| system | [-sp] = ASTAT | 0 | 0 | 0 | a |
| system | ASTAT = [sp++] | 0 | 0 | 0 | b |
| 1 | R0 = b[P0] (z, excl) | 1 | 0 | 0 | b |
| 1 | CC = (b[P0] = R1)(excl) | 1 | 1 | 1 | 1 |
| system | CC = syncexcl | 0 | 0 | 0 | 1 |
| system | [-sp] = ASTAT | 0 | 0 | 0 | 1 |
| system | ASTAT = [sp++] | 0 | 0 | 0 | a |
| 0 | CC = (b[P0] = R1) (excl) | 0 | 0 | 0 | 0 |
| 0 | CC = syncexcl | 0 | 0 | 0 | 0 |
| system | CC = syncexcl | 0 | 0 | 0 | 0 |
| system | [-sp] = ASTAT | 0 | 0 | 0 | 0 |
| system | ASTAT = [sp++] | 0 | 0 | 0 | 1 |
| 1 | if !CC jump spin; | | success - fall through | | |

Note that in the foregoing example, for the sake of simplicity, the value of the XWACTIVE bit and asynchronous updating of XWAVAIL are not shown.

Note that the activities discussed above with reference to the FIGURES are applicable to any integrated circuits that involve signal processing (for example, gesture signal processing), particularly those that can execute specialized software programs or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

The foregoing outlines feature several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form. Furthermore, any of the foregoing may be used to provide an emulation or virtualization environment in which certain hardware functions are provided in software emulation or virtualization.

In the discussions of the embodiments above, the buffers, peripheral interface elements, interconnect boards, clocks, DDRs, digital cores, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

What is claimed is:

1. A system on a chip comprising:

a memory;

a memory bus communicatively coupled to the memory; and a processor communicatively coupled to the memory via the memory bus, the processor including circuitry for providing store exclusive functionality comprising:

a store exclusive initialize (STREX_INIT) instruction, the STREX_INIT instruction operable to initiate an exclusive store transaction to a location in the memory;

a store exclusive synchronize (STREX_SYNC) instruction, the STREX_SYNC instruction operable to monitor an XWAVAIL indicator, the XWAVAIL indicator operable to indicate that an XWRESULT response to the STREX_INIT primitive is available, the XWRESULT response operable to indicate whether the exclusive store transaction to the location in memory was successful.

2. The system on a chip of claim 1, wherein the memory has stored therein an operating system, including instructions to provide semaphore handling via the store exclusive functionality.

3. The system on a chip of claim 1, wherein the memory has stored therein an operating system, including instructions to perform an unconditional STREX_SYNC upon a context switch.

4. The system on a chip of claim 1, wherein the memory bus is an advanced extensible interface (AXI) bus.

5. The system on a chip of claim 1, wherein the STREX_SYNC primitive is interruptible by a system interrupt.

6. The system on a chip of claim 1, wherein:

the processor is further operable to provide a load exclusive (LDEX) primitive preceding the STREX_INIT primitive, wherein LDEX, STREX_INIT, and STREX_SYNC together comprise an atomic transaction;

and the STREX_INIT primitive is operable to fail without initiating a store transaction if an interrupt occurs between LDEX and STREX_INIT and initiates a second LDEX.

7. The system on a chip of claim 1, wherein the processor is further operable to, if an interrupt occurs between the STREX_INIT primitive and the STREX_SYNC primitive and if the interrupt performs a second STREX_SYNC, the STREX_SYNC primitive is operable to enter a no operation state.

8. A digital signal processor system comprising:
a memory;
a memory bus communicatively coupled to the memory; and
a compute unit communicatively coupled to the memory via the memory bus, the compute unit operable to provide a store exclusive primitive comprising:
executing a store exclusive initialize (STREX_INIT) primitive, the STREX_INIT primitive operable to initiate an exclusive store transaction to a location in the memory;
executing a separate store exclusive synchronize (STREX_SYNC) primitive, the STREX_SYNC primitive operable to monitor an XWAVAIL indicator, the XWAVAIL indicator operable to indicate that an XWRESULT response to the STREX_INIT primitive is available, the XWRESULT response operable to indicate whether the exclusive store transaction to the location in memory was successful.

9. The digital signal processor system of claim 8, wherein the memory bus is an advanced extensible interface (AXI) bus.

10. The digital signal processor system of claim 8, wherein the STREX_SYNC primitive is interruptible by a system interrupt.

11. The digital signal processor system of claim 8, wherein the STREX_SYNC primitive is operable to enter a no operation state if the system interrupt initiates a second STREX_INIT primitive.

12. The digital signal processor system of claim 8, wherein the STREX_INIT primitive requires a determinate number of clock cycles to execute.

13. The digital signal processor system of claim 8, wherein the XWRESULT indicator is provided by the memory bus.

14. The digital signal processor system of claim 8, wherein the STREX_INIT primitive is configured to raise an exception if a second STREX_INIT is executed before a STREX_SYNC is executed.

15. A method of providing a store exclusive primitive, performed by a computing device, comprising:
executing a store exclusive initialize (STREX_INIT) primitive, the STREX_INIT primitive operable to initiate an exclusive store transaction to a memory location;
executing a separate store exclusive synchronize (STREX_SYNC) primitive, the STREX_SYNC primitive operable to monitor an XWAVAIL indicator, the XWAVAIL indicator. operable to indicate that an XWRESULT response to the STREX_INIT primitive is available, the XWRESULT response operable to indicate whether the exclusive store transaction to the memory location was successful.

16. The method of claim 15, wherein the STREX_SYNC primitive is interruptible by a system interrupt.

17. The method of claim 15, further comprising:
executing a load exclusive (LDEX) primitive preceding the STREX_INIT primitive, wherein LDEX, STREX_INIT, and STREX_SYNC together comprise an atomic transaction; and
failing the STREX_INIT primitive without initiating a store transaction if an interrupt occurs between LDEX and STREX_INIT and initiates a second LDEX.

18. The method of claim 16, further comprising, if an interrupt occurs between the STREX_INIT primitive and the STREX_SYNC primitive and if the interrupt performs a second STREX_SYNC, performing a no operation state in place of the STREX_SYNC primitive.

19. The method of claim 15, wherein the STREX_INIT primitive requires a determinate number of clock cycles to execute.

20. The method of claim 15, wherein the XWRESULT indicator is provided by a memory bus.

21. The method of claim 15, wherein the STREX_INIT primitive is configured to raise an exception if a second STREX_INIT is executed before a STREX_SYNC primitive is executed.

* * * * *